Sept. 16, 1969  G. A. BENTLEY  3,467,421
FLEX JOINT
Filed June 7, 1965  6 Sheets-Sheet 1
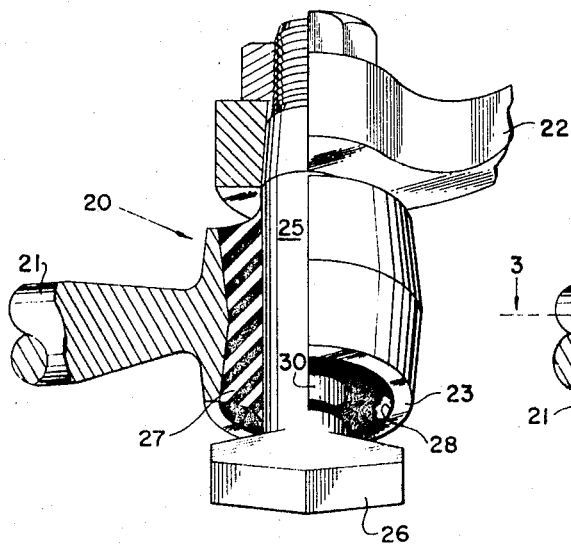
FIG_1
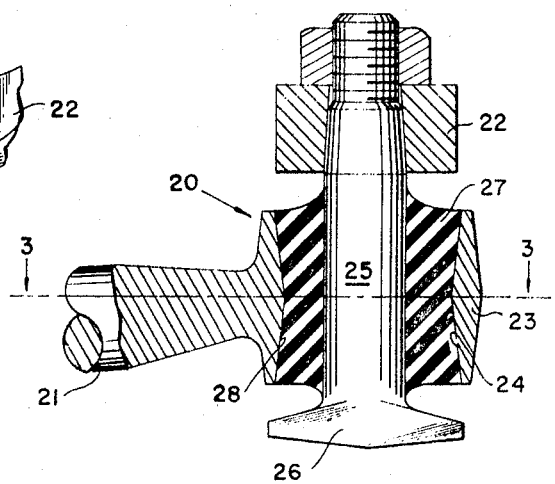
FIG_2
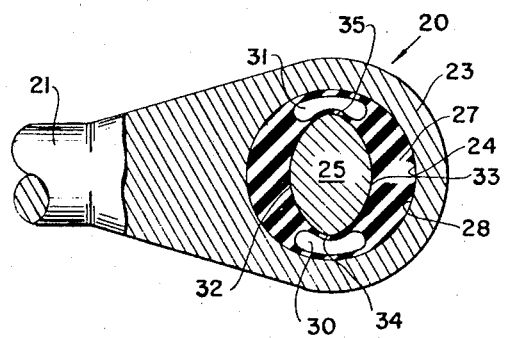
FIG_3
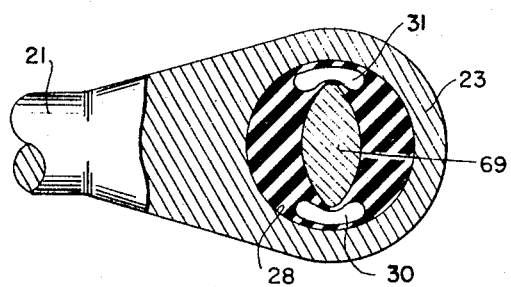
FIG_4

Sept. 16, 1969     G. A. BENTLEY     3,467,421
FLEX JOINT
Filed June 7, 1965     6 Sheets-Sheet 2
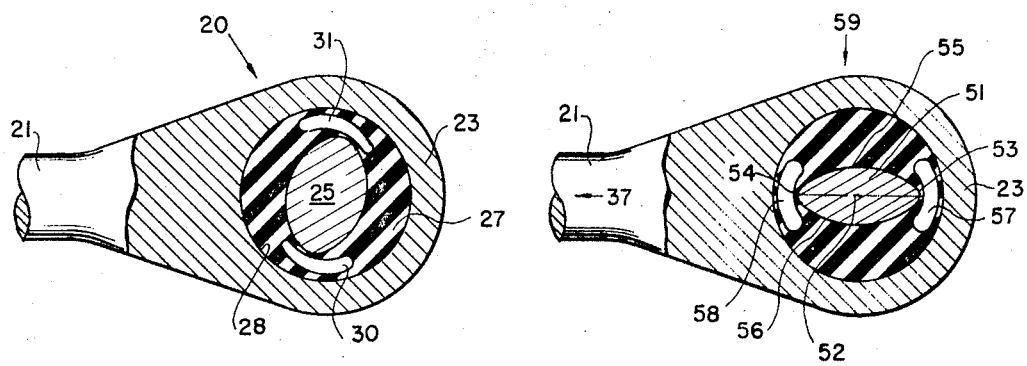
FIG_5     FIG_6
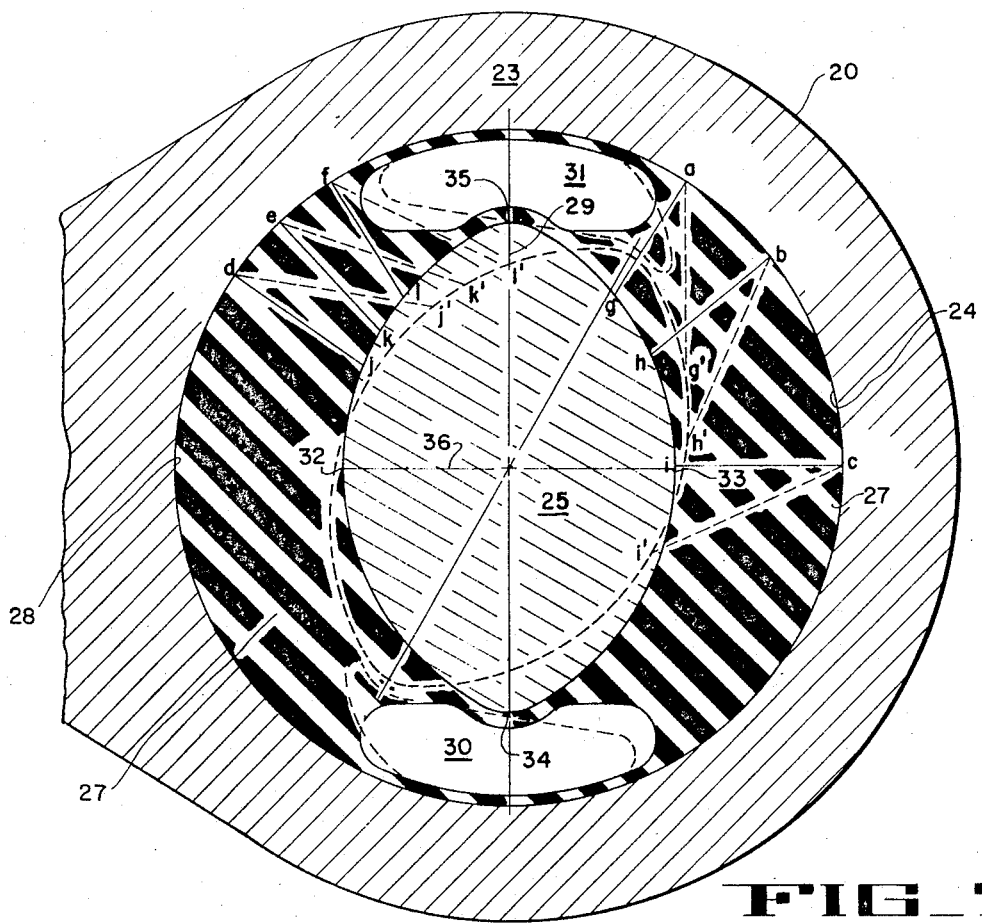
FIG_7

Sept. 16, 1969  G. A. BENTLEY  3,467,421
FLEX JOINT
Filed June 7, 1965  6 Sheets-Sheet 3
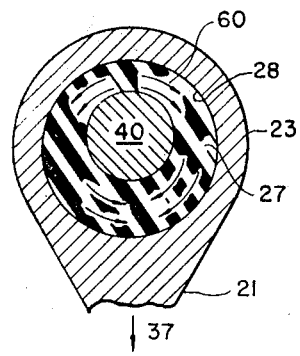
FIG_8
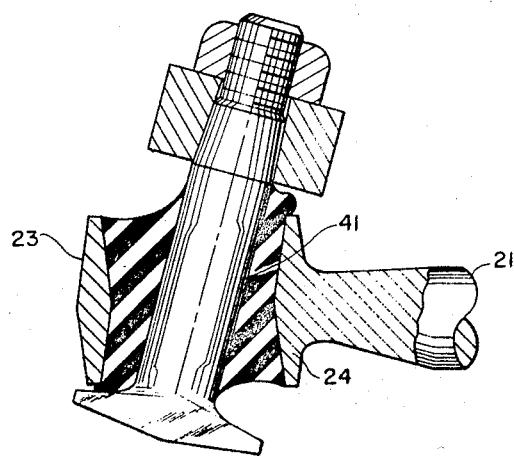
FIG_11
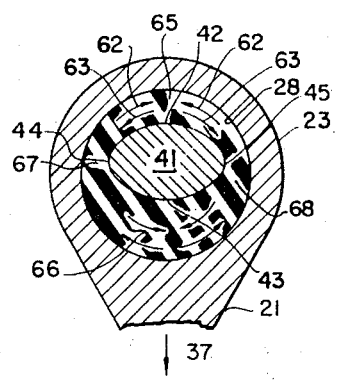
FIG_9
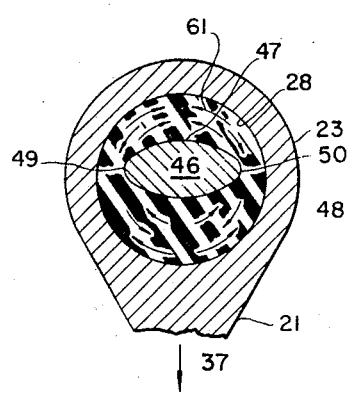
FIG_10
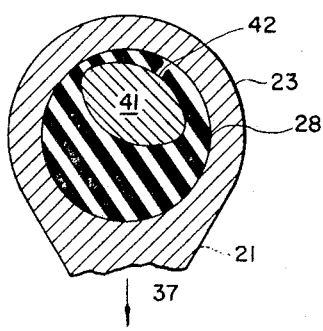
FIG_12

Sept. 16, 1969     G. A. BENTLEY     3,467,421
FLEX JOINT
Filed June 7, 1965     6 Sheets-Sheet 4
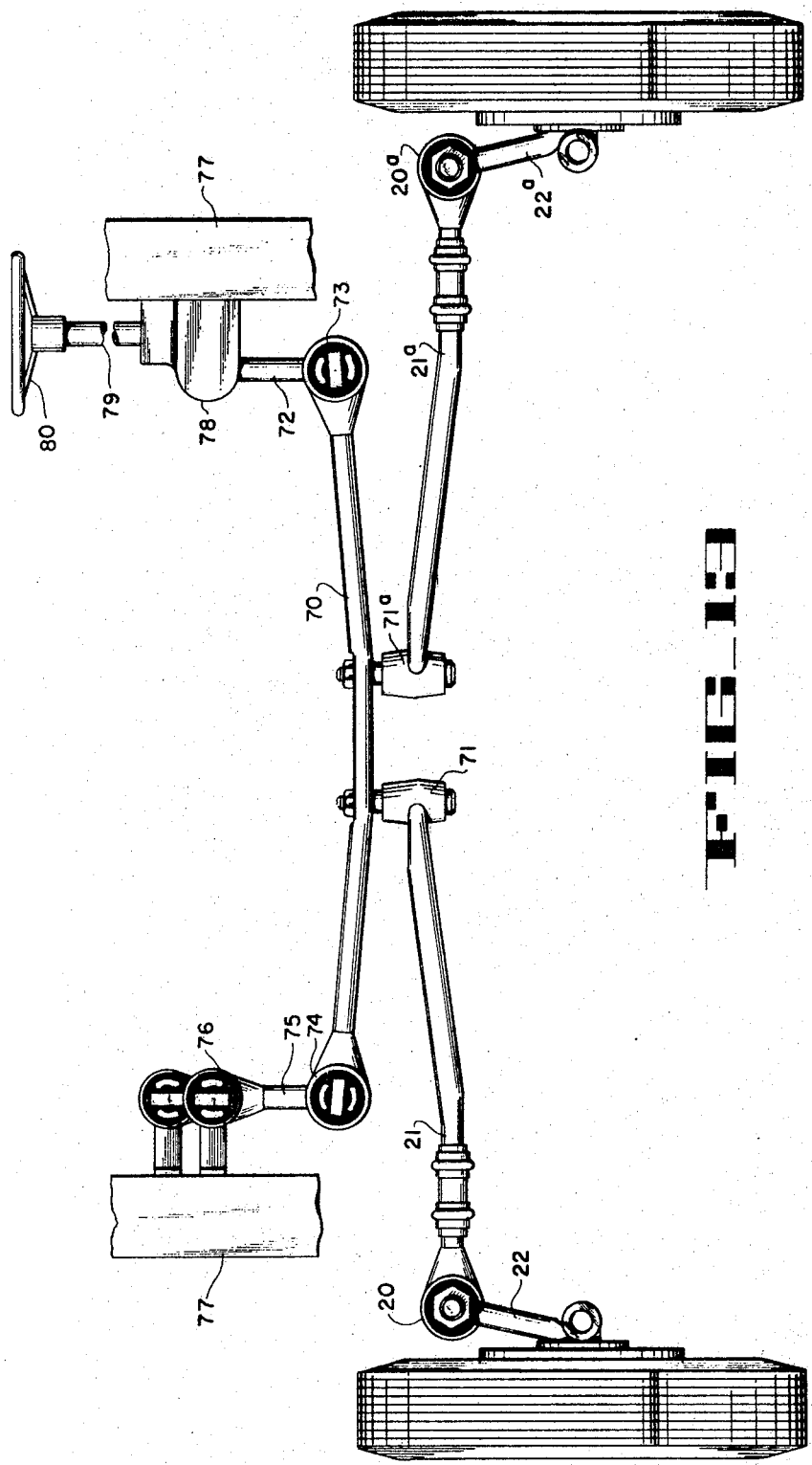
FIG_13

Sept. 16, 1969   G. A. BENTLEY   3,467,421
FLEX JOINT
Filed June 7, 1965   6 Sheets-Sheet 5
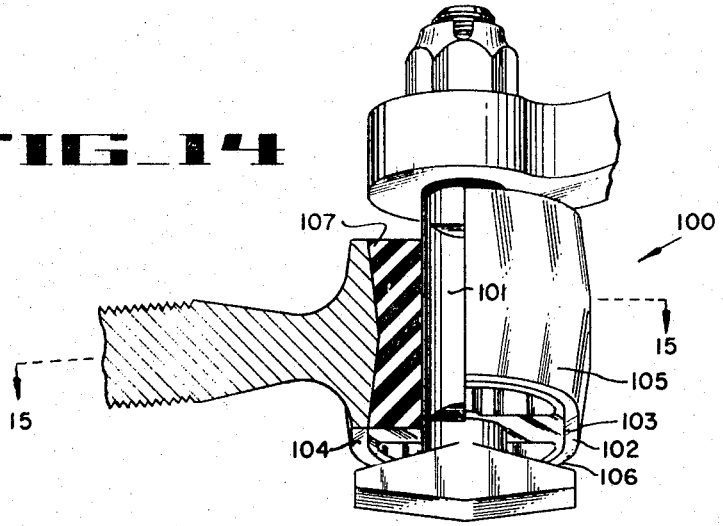
FIG_14
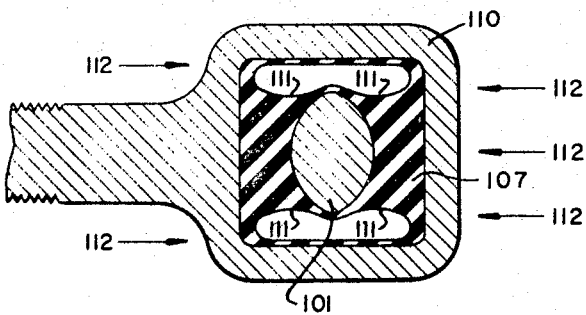
FIG_16
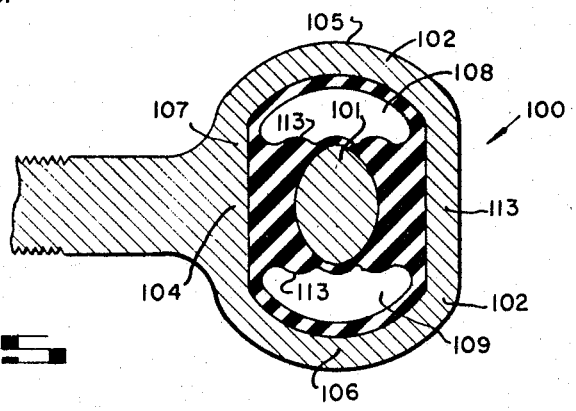
FIG_15

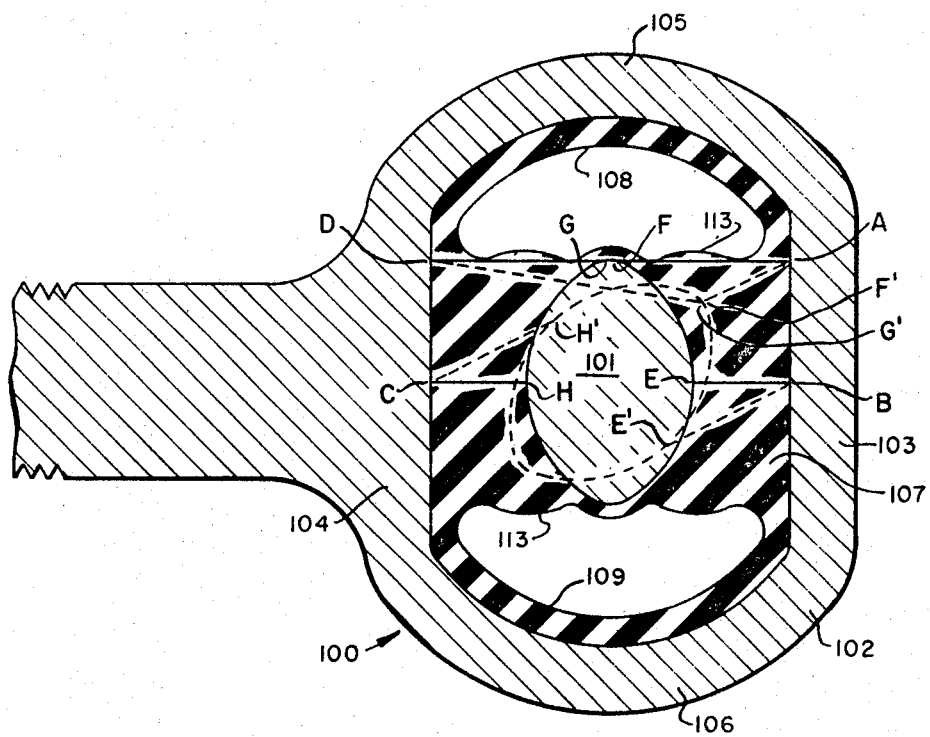

United States Patent Office 3,467,421
Patented Sept. 16, 1969

3,467,421
FLEX JOINT
Gustavus A. Bentley, Redwood City, Calif., assignor to Federal-Mogul Corporation, Detroit, Mich., a corporation of Michigan
Filed June 7, 1965, Ser. No. 461,968
Int. Cl. F16b 7/00; F16f 1/38
U.S. Cl. 287—85                                   5 Claims

ABSTRACT OF THE DISCLOSURE

A joint connection wherein two relatively movable rods with interlocking ends are spaced from direct contact with each other by a molded elastomeric material bonded to both of the interlocking ends is characterized by one rod end being shaped as a generally cylindrical ring, preferably circular in cross section, and the other rod end having a stud with a generally oval cross section along the plane of the ring. The stud extends generally perpendicular to the plane of the ring and passes axially and centrally through the ring. The elastomeric material substantially fills the space between the stud and the ring, except for two void spaces diametrical opposite each other at the opposite extremities of the major axis.

---

This invention relates to an improved mechanical linkage joint. More specifically, it relates to improvements in elastomeric flex joints like those set forth in application Ser. No. 330,518, filed Dec. 9, 1963, by Vasalie L. Pieckii et al. and now Patent No. 3,233,928.

In contrast to ball joints and hinges where rigid members directly engage each other and generate friction upon relative rotation, the present invention relates to a linkage in which a metal stud and a surrounding metal ring are spaced apart from each other and are joined together by an elastomeric member bonded to both the stud and the ring, the elastomeric member acting somewhat like a viscous liquid to float the metal parts relatively to each other. Typical assemblies of the invention may be used in steering gear linkages, universal joints, wheel suspensions, and shock absorber arms, as well as in other environments where ball joints and hinges have been used.

For example, each steering linkage system for the front wheels of an automobile has heretofore required several ball joints, each of which is relatively expensive and usually requires maintenance lubrication. The present invention makes it possible to provide a superior steering linkage joint, and one object of the invention is to provide a simpler and more reliable joint which has no maintenance requirements over a long useful life.

General advantages of flex joints over ball joints for certain purposes

For many uses, the joint of this invention has substantially all of the advantages of a ball joint, but in addition it is simpler, requires no maintenance, damps shock and vibration and is free from that wear which results from sliding friction. In many applications, the joint of this invention has a much longer life than joints heretofore in use. Furthermore, the joint is fail-safe, in that if the elastomer should fail completely there are interlocking metal parts that still do not come apart.

Special advantages of flex joints in automotive steering systems

When used in a steering linkage, the flex joints of this invention help to reduce the transmittal of road-and-front-wheel noise, shock, and vibration through the steering linkage, thereby giving a quieter ride and a more solid-sounding car. An inherent centering force that can be built into these joints, together with their inherent freedom from friction, enables alteration of the front-end geometry so as to lower the steering wheel rim force. Since the joints have no clearance between their moving parts, they have no free play at any time; in contrast to conventional joints in which the free play increases with wear, the joints of this invention have no wearing surfaces and remain tight during their entire service life. Moreover, shock loads (such as are caused when a front wheel drops in a chuckhole in a road) have heretofore been transmitted to the steering gear box undiminished by a conventional linkage; whereas, in the present invention the shock is dampened by each joint, and each joint through which the shock passes reduces the severity of the shock transmitted to the succeeding element. This is done by what may be termed "amplitude dampening" in which the peaks of the force curve are lowered by spreading the force over a longer period of time.

Some problems to which the invention is addressed

Heretofore, flex joints have tended to fail because of failure of the rubber-to-metal bond on the inner stud, especially on the surface of the stud opposite from the rod along which the main force is applied. Failure of this bond has reduced the effectiveness of the joint by reducing its ability to transmit torque and by making the joint act in a loose sloppy manner. In addressing this problem, care must be taken not to introduce other problems, such as causing over-elongation of the elastomer during operation of the joint.

Another problem has been to limit the amount of displacement of the stud relative to the ring in the direction along which the main force is applied when the steering wheel is turned in order to turn the front wheels. The exerted displacement force is resolved into rotary movement of the ring relative to the stud with a minimum of linear displacement, yet a suitably flexible shock-absorbent elastomer is used. An object of this invention is to obtain some damping while holding displacement to a low value, and to hold the rotary force for turning to desired values.

In connection with these two problems it is important that the joint be able to rotate freely in a horizontal plane over an angle comprising its steering range, which may be about 80°—i.e., 50° in one direction from a center or straight-ahead position and about 30° in the other direction, or may be some other angle. At the same time, the joint should be able to tip or have the stud rotate in a vertical plane relative to its ring over a suitable angle, which may be, for example, ±15° from vertical, or about 30° overall. The back-and-forth movement (displacements) along the direction of the line of action should be kept small, for example, between ⅛" and ¼" overall.

Finally, to be feasible the joint must not be too large or too heavy and it should not use so much material as to become expensive.

Each of these problems will now be discussed in detail.

Failure of the rubber-to-metal bond on the stud surface

The seriousness of failure of this bond has been briefly remarked on, and any skilled engineer can see the danger of such failures.

All elastomers suitable for use in elastomeric flex joints have a relatively low tensile bond strength when adhered to metal. The strength is less in tension than in compression, yet the joints have tended to fail first at the very point where it might be thought that the bond was in compression. Consider a joint comprising a round stud on a first rod and a surrounding ring on a second rod, with elastomer bonded to both the stud and the ring and separating them from each other. When force is exerted along either rod and along a line of action passing through the center of the ring, the stud is forced toward one side of the ring and away from the other side. On the side of the stud that is pushed toward the ring, the elastomer is placed in compression, while it is placed in tension on the side of the stud that is pulled away from the ring. Yet, bond failure tends to occur first on the side where the elastomer is compressed, this tendency being aggravated when a twisting motion accompanies the compression.

Apparently, the circular stud tends to shear through the elastomer on the compression side and to force the elastomer there to flow outwardly. Since the force is great and is highly concentrated over a small area, the movement of the stud toward the ring is relatively great, while the tendency of the rubber to flow is very high at the area where it is bonded to the stud. Tangential forces then appear that apparently act in tension to *pull* the elastomer at locations where the rubber might appear to be solely in compression. At any rate, bond failures have consistently tended to occur at that location, and this is one of the problems to which the present invention is directed.

Reducing relative displacement of the stud and ring along the line of action As just mentioned, in linear displacement along the line of action, the circular stud tends to plow through the elastomer to shear it instead of to compress it. This is because the stud is relatively small, as it must be wherever space is at a premium. As a result, the stud tends to move rather far in relation to the amount of force applied, and it imparts a mushy unresponsive feel to the steering. Reduction of such displacement by increasing the joint size (i.e., the size of the ring) is often impractical, and reduction by stiffening the rubber is also impractical because the abilities of the elastomer to dampen shock and vibrations, to turn easily and to elongate are lost thereby, to a serious and unacceptable degree. As will be seen, the present invention also gives improved results in this connection.

Need for three degrees of movement

Since the joint: (1) is rotated in a horizontal plane (for turning the wheels), (2) is rotated (or tipped) in a vertical plane (for absorbing shock and vertical wheel movement), and (3) is also subjected to limited linear displacement, along the line of action, one cannot merely increase the joint size or resort to any approach which will adversely affect these three movements to any great degree. Moreover, at the time while the joint is being rotated in a horizontal plane (as when the wheels are turned) the tipping and displacement forces can simultaneously be exerted. Hence, a joint designed to give nearly ideal results in displacement at times when the wheels are straight ahead, may not give good results when the wheels are turned, and vice versa. Thus, a theoretically good stud shape may be improved for practical purposes by approaches that might at first seem unlikely to succeed.

Joint size, weight, and cost

The more material used, the higher the cost, the greater the weight, and the more bulky the joint. Hence, making a joint larger may be quite impractical.

An important object of this invention is to make a small joint having the capacity to withstand relatively large forces. Such joints are important in solving the problems of space limitation commonly encountered.

Five factors control the size of a joint of this type: (1) the space available, (2) the forces it is to encounter, (3) the amount of rotary motion required, (4) the amount of conical motion required, and (5) the amount of radial motion permitted. If the space available is unlimited, there is still the limiting factor of cost, and the forces to be encountered are of primary importance.

In many applications the joint size is largely determined by the space available. By way of example, an automotive steering system as a whole has to fit into a limited space, and each joint has to fit into a limited space of its own. The available space in an automobile is limited by the distance between wheels, the clearance between the engine and the ground, the space between the frame members and the engine, and the geometry of the steering system itself (for example, the angle between the steering arm and the king pin). Clearances are also required between the steering arm and the tire.

The space-limitation problem cannot be solved merely by making the joints smaller, for in small joints the forces applied may destroy the joint or shorten its life. In a typical steering system the forces applied to the steering arms and rods may be as much as about 750 pounds, but the maximum force that can long be safely applied to the bond between neoprene rubber and steel is in the range of 250 to 300 p.s.i. (While the actual bond strength may be somewhat higher, the joint cannot long endure higher values.) Unless the force applied to the joint is so distributed that the internal pressures within the joint will not destroy the bond, the bond will fail. Merely increasing the bond area will not be sufficient where some small areas are subjected to larger pressures than they can withstand, as discussed above in connection with the problem of bond strength.

Joint life and the effect on it of torque and resultant elongation

The life of the joint also depends upon the ability of the elastomer to endure flexing under the forces applied to it, especially torque, the movement applied to rotate the joint. The torque might ordinarily be applied in simple limited rotary motion but, as stated above, in an automobile the joint will at times also have the ring tipped relative to the stud; so the joint rotates along any or both of two mutually perpendicular axes. When a pushing or pulling force is applied to the steering arm to cause a turning motion of the road wheel, the joint between the steering arm and a connecting rod is twisted in a horizontal plane. When the road wheel is turned while the automobile is in motion and while it is riding over bumps, the road wheel also rises and falls; then, in addition to this twist, there is also a tipping of the ring relative to the stud, the direction of tip depending on whether the road wheel is rising or falling.

The application of torque causes elongation and compression of the rubber, and the extent of elongation can be a limiting factor on the life of the joint.

Considering the amount of rotary motion and conical motion (rotary motion in both planes) required of a joint, the rubber should not be elongated over 50% if the joint is long to endure. With pure rotary motion, the height (along the stud axis) of a joint assembly is not important; the relationship for stretching remains the same at the center as it does for either end between the stud and the surrounding ring. In conical motion, however, the length of the stud and of the surrounding ring is very important. The farther away from the center of turning, the less the angle of displacement will be for any given amount of flexing of the rubber. If the elastomer thickness is to be, for example, ¼", and the distance from the center of rotation to the end of the elastomer is ½", the conical displacement for a 50% elongation is approximately 15°. If, however, the distance from center of rotation to the end of the elastomer is 2" and the same ¼" thickness of rubber is used, the conical displacement is only about 2°.

When these dimensions are settled upon, the amount of linear displacement permitted along the line of action can again be considered. This is best controlled at the mid-point of the ring and stud in the general area of the center of rotation. It is possile to have a wasp-waisted outer ring or a barrel-shaped stud in order to get closer clearance between stud and ring. The less space that is taken up by the rubber in a joint of this configuration, the less will be the possible displacement. Here, again, however, the rubber should preferably not be stretched beyond 50% elongation, and it should be remembered that a displacement which is 30% of a given rubber thickness is a displacement of 60% for a part that is half as thick. The points where the rubber is thinned also have the highest pressures generated by radial loads. If, therefore, a load is applied, the areas where the rubber is thinnest are normally the first areas to fail.

Illustration of the problems

To illustrate these problems, consider a good flex joint of the type described in application Ser. No. 330,518, having a round stud inserted in a round ring with elastomer between them and bonded to both of them. This joint gives good results in many situations, but there are situations where the forces to be applied are larger than a particular size of joint (i.e., a particular volume of elastomer of this configuration) can take, and where space limitations prevent enlargement of the ring and its bore. It might be thought that one could at least increase the size of the stud, especially since the surface of the stud being the smaller of the two concentric cylindical surfaces is actually the more critical area. However, to increase the diameter of this stud to a theoretical maximum would give a stud as large as the bore of the ring in which it is inserted, and there would then be no room between them for elastomer; so the joint could neither rotate nor tip. Even a modest increase in the size of the stud reduces the remaining elastomer section and makes the elastomer elongation problem critical when the stud is rotated relative to the surrounding ring.

For example, suppose that the distance between the internal stud and the external ring is normally ¼" and that a 45° twist of the stud stretches the rubber bridging this distance from ¼" to ⅜" in a particular installation, which is a rubber elongation of 50%. Then, if the diameter of that stud were increased until the distance between the stud and the ring were ⅛", the rubber bonded between the ring and the stud, when rotated 45°, would then have to stretch from ⅛" length to ⅜" length. This is an elongation of 200%, or four times as much as formerly, while the stud area may have increased only about 20%. Hence, while enlargement of the stud would have decreased the unit area pressure by about 20%, it would have approximately quadrupled the amount of flexing required of the rubber.

The invention in general

The present invention increases the load-carrying capacity of the joint, reduces the amount of displacement, increases the surface bonding area of the stud, and spreads out the forces tending toward bond failure over a larger area, all without causing such elongation problems. The key is its provision of a stud that is flattened in cross-section rather than round. The stud surface area is increased relative to a round stud having the same cross-sectional area, yet on the flattened sides the stud may be actually farther away from the surrounding ring in some areas. The cross-section of this new stud approaches a generally oval or approximately elliptical shape, though it may be made from a combination of circular arcs of two different radii. Another feature of the invention is that at the ends of the major axis of its cross-section the stud can lie very close to the enclosing ring, for the rubber is not subjected to over-elongation because in this invention the structure calls for voids instead of rubber at those places. Since the flattened portions are somewhat farther away from the external ring, the actual flexing requirements of the remaining rubber is somewhat reduced; so there are less stringent requirements on the rubber there, and the flex life is increased.

As a result of a new oval stud configuration of this invention with voids at the ends of the major axis, the effective surface area of the stud can be nearly doubled and the surface area under true compression can be multiplied many times without materially increasing the percentage of elongation of the rubber for any given amount of twist. In other words, the internal unit area loading can be reduced below the required 300 p.s.i. without changing the external dimensions of the joint, and the novel configuration significantly lengthens joint life both by reducing the unit area stresses tending to destroy the bond and by reducing the percentage of elongation of the elastomer when torque is applied. In testing actual samples it has been possible to obtain a joint life increase of about 300% over similar joints with cylindrical studs.

Of special interest are the results of having the flattened curved stud surface substantially "parallel" to the arc of the bore; this being "parallel" in the sense that in the direction of the minor axis of the stud, the two arcs are the same distance apart. This gives less radial movement per a given amount of pressure. The rubber between the two "parallel" surfaces does not tend to be extruded, whereas rubber caught between the diverging surfaces of a round stud and its surrounding ring tends to extrude, due to a snowplow-like action of the stud.

Other objects and advantages of the invention will appear from the following description of a preferred embodiment.

The drawings

FIG. 1 is a view in perspective and partly in section of a joint embodying the principles of the invention. The rods leading from the joint are broken off to save space.

FIG. 2 is a view in elevation and in section of the joint of FIG. 1.

FIG. 3 is a view in horizontal section of the joint of FIG. 1 taken along the line 3—3 in FIG. 2.

FIG. 4 is a view similar to FIG. 3 of a modified form of joint with a stud of flatter cross-section.

FIG. 5 is a view similar to FIG. 3 showing the joint of FIG. 3 in torsion.

FIG. 6 is a view similar to FIG. 3 of a modified form of the invention with the stud lying in a position 90° different from that of FIG. 3.

FIG. 7 is an enlarged view of the joint of FIG. 3 showing some force patterns diagrammatically to illustrate what happens when the ring and stud rotate relatively to each other about a horizontal plane.

FIG. 8 is a diagrammatic view showing how a linear displacement force along a line of action acts in a joint with a round stud in a round bore.

FIG. 9 is a view similar to FIG. 8 illustrating the action of a similar displacement force of an approximately elliptical stud in a round bore.

FIG. 10 is a view similar to FIGS. 8 and 9 indicating the action of a similar displacement force in a joint with a still flatter stud.

FIG. 11 is a view similar to FIG. 2 showing the joint in a tipped position.

FIG. 12 is a view similar to FIG. 9 showing the effect of linear displacement along a line of action on a twisted joint.

FIG. 13 is a fragmentary plan view of a steering system employing several of the joints of this invention.

FIG. 14 is a view similar to FIG. 1 of a modified form of joint also embodying the principles of the invention.

FIG. 15 is a view in section taken along the line 15—15 in FIG. 14.

FIG. 16 is a view similar to FIG. 15 showing the joint at an earlier stage of manufacture.

FIG. 17 is an enlarged view like FIG. 15 showing some force patterns resulting when the stud is turned relative to its ring.

The joint 20 of FIGS. 1–3

The joint 20 shown in perspective in FIG. 1 may be used in automobile steering systems (cf. FIG. 13) or in other places where flex joints are used, enabling rotation along predetermined directions of one rod 21 relative to another rod 22. The rod 21 is preferably provided with a ring-like end 23. While the ring 23 is generally rectangular in vertical cross-section (cf. FIG. 2) it preferably has tapered walls 24 flaring outwardly from the center to improve the tipping action of the ring 23 relative to its stud 25. The ring 23 is substantially round, though it may be somewhat flattened, and it is preferably somewhat thicker than the rod 21. The other rod 22 is attached to a stud 25, which is provided with an enlarged end member 26 so that the stud 25 cannot be withdrawn from the ring 23; the joint is therefore fail-safe, for the stud 25 and the ring 23 will not come apart accidentally, even if the joint 20 fails. An elastomer web 27 is bonded to both the stud 25 and the bore 28 of the ring 23, except that at the ends of the major axis 29 (see FIG. 7) of the stud 25, openings or voids 30 and 31 are provided. Where the ends of the holes 30 and 31 intersect the outside edge, the surface of the rubber is rounded to insure that sharp corners are not encountered which will give stress raisers with accompanying focal points for failure.

Neoprene is a suitable elastomer for this joint. It has a natural ability to withstand ozone without deterioration. Well-known low-temperature neoprene compounds remain resilient at temperatures as low as 43° F. below zero and are also capable of withstanding temperatures up to 160° F. without deterioration.

Critical to the present invention is the non-circular cross-sectional shape of the stud 25. It is generally oval, though it may be made from four circular arcs, as shown in FIG. 7: large-diameter circular arcs 32 and 33 comprising most of the surface and small-diameter circular arcs 34 and 35 at the ends of the major axis. The overall effect is that of an oval, and superficially it may resemble an ellipse, but it need not be—preferably is not—a true ellipse. An important feature is the placing of the major axis 29 and the location of two voids 30 and 31, one at each end of the major axis, in the preferred embodiment.

The flattened sides 32 and 33 of the oval 25 afford considerably more surface area than would a circular arc in a stud having the same cross-sectional area. The sharper ends 34 and 35 can approach closer to the ring bore 28 than could a circular stud, for the voids 30 and 31 eliminate the elongation problem at this critical location, while the elongation problem is further ameliorated by the flattening of the sides 32 and 33, which results in a considerable net increase in the volume of the elastomer under compression, as will be explained. Also, the bonding area on the stud 25 has been considerably increased, which in itself means that the joint 20 is less likely to have a bond failure than would a circular stud of the same ring size, because of decreased unit area loading, while the torque problem has also been somewhat ameliorated. The joint 20 is therefore longer lived, stronger and less likely to fail than a joint 20 having a circular stud inside the same ring.

"Parallelism"

More important, this structure results in a shape that approaches or has an increased degree of "parallelism" between the flattened surfaces 32 and 33 of the stud 25 and the cylindrical surface of the bore 28 (except at the ends where the openings 30 and 31 are provided). This near "parallelism" becomes important when the joint 20 is subjected to relative translation of the stud 25 and the ring 23, when the stud 25 moves closer to one side of the ring 23 and further away from the opposite side, as shown in FIGS. 8–10 where some force diagrams are shown.

By "parallelism," concentricity is *not* meant. Rather, considering action along a line perpendicular to the major axis 29, which is parallel to the minor axis 36 and is along the axis of the rod 21, and measuring in that direction only, the points on the curve 32 are always the same distance from the points on the bore 28 that are axially in line therewith. This is the distance between the surface of the stud 25 and the surface of the bore 28 during relative translation along a line of action 37, which may or may not coincide with the axis of the rod 21. This point will receive further explanation in connection with FIGS. 8–10.

General comparison of several stud shapes
(FIGS. 8–10 and 6)

FIGS. 8–10 show three identical rings 23, but three quite different studs.

FIG. 8 shows a circular stud 40 normally concentric with the ring 23, the radius of the stud 40 being smaller than the radius of the bore 28. In linear displacement of the ring 23 relative to the stud 40 along the line of action 37, the arc of the stud 40 lies closer to the bore 28 at the middle than at the ends.

FIG. 9 shows a stud 41 with "flattened" curved sides 42 and 43 and "sharper" curved ends 44 and 45; the sides 42 and 43 are "parallel" to the bore 28 in the sense just described for translation along the direction of the minor axis thereof. The radius of the sides 42 and 43 is the same as that of the bore 28, but the centers are displaced.

FIG. 10 shows a still flatter stud 46 with still flatter sides 47 and 48 and ends 49 and 50; the stud 46 has its sides 47 and 48 closer to the bore 28 at the ends than at their middles (for motion along the minor axis; i.e., along the line of action 37), and the radii of the curves 47 and 48 are greater than the radius of the bore 28.

A further variation is shown in FIG. 6, where the same ring 23 is used with a stud 51 that may be shaped substantially like the stud 41 of FIG. 9, but which has its major axis 52 oriented in the same direction as the rod 21. When the line of action 37 is in the same direction as this major axis 52, then the relatively sharp ends 53 and 54 are displaced and the rubber between them and the ring 23 along the line of action 37 is in compression at one end and in tension at the other end. Then, the elastomer around the flatter sides 55 and 56 of the stud 51 is in shear. This joint may have voids or openings 57 and 58, as shown. (Note that if a line of action 59 perpendicular to the major axis 52 is used, the joint of FIG. 6 acts substantially like that of FIGS. 1–3 in response to the line of action 37, and vice versa.)

When an external force is applied to the ring 23 along the axis of the rod 21 in a line away from each stud 40, 41, 46 and 51, the rubber 27 on one side of the stud is put under compression, and the rubber on the opposite side of the stud is put under tension, while the rubber at the ends is in shear. The direction of application of the force; i.e., the line of action 37 is in FIGS. 8–10, lengthwise of the sheet and toward the bottom of the sheet. The elastomer 27 on each side of the stud (this is at each end of the plane perpendicular to the line of action) is then under shear.

The effect of translation along the illustrated line of action (FIGS. 6 and 8–10)

The relation between the curvature of the stud 25 and the curvature of the bore 28 of the surrounding ring 23 is important, especially in connection with the line of action with which the joint is actually to be used;

(1) When a stud 51 is placed with its major axis 52 parallel to the line of action 37, the thin edges 53 and 54 of the ovoid stud 51 approach the sides of the ring 23. The translating force applied along the line of action 37 causes the stud 51 to act like a knife, tending to cut through the rubber;

(2) When a round stud 40 is used (FIG. 8) there is the same general effect, but to a smaller degree, because the sharpness of the curve has been lessened. But translation still causes a strong parting force, for the rubber 27 tends to extrude freely in the direction shown by the arrows 60 in the upper part of FIG. 8;

(3) With a quite flat stud 46, in which the radius of the stud 46 is larger than the radius of the surrounding ring 23, the rubber has a tendency to flow inwardly and to become pressurized during translation, as shown by the arrows 61 in the upper part of FIG. 10, yet it has to flow out axially in order for there to be movement. The two surfaces 28 and 47, when pressed together, tend to come together at the outside edges 49, 50 and to leave more space on the inside, thereby tending to force most of the rubber from the edges in toward the center or line of action of the assembly where the increased pressure results in axial flow of the rubber;

(4) In the structure of FIG. 9, the parting forces are small and the forces causing flow are more nearly balanced, as indicated by the balanced arrows 62 and 63 in the top portion of FIG. 9. There, the radius of the arc 42 is equal to the curve of the surrounding ring 23, and the surface of that portion 42 of the stud 41 and the surface 28 of the surrounding ring 23 are parallel. In this case, the rubber 40 is between two essentially parallel pieces (so long as the movement along the line of action is considered) and gives maximum support on the compression side. Hence, with the external forces being absorbed over a greater internal area, the unit area forces on the metal-elastomer bond are reduced, and the strength of the joint is limited, for all practical considerations, only by the flex strength of the elastomer itself.

Each of these configurations thus gives a different response for absoring shock; i.e., in translation the rubber under compression is of greatest concern because that is where the greatest pressures are built up. In the joint of FIG. 6, in which the stud 51 is on edge and has a tendency to knife through the rubber, the magnitude of the movement of the stud 51 relative to the surrounding ring 23 is greatest for any given force along that line of action, and the least resistance is offered to this displacement. With the joint of FIG. 9 where the axis of the stud 41 lies at 90° to the line of action 37 and where the curves 42 and 43 approach "parallelism" with the bore 28 of the external ring 23, stud 25, the motion is the most restricted. Thus, FIGS. 6 and 9 represent two extreme conditions: two parallel surfaces approaching each other (FIG. 9) or a knife edge approaching a flat surface (FIG. 6). The purpose of the joint will affect the choice of the precise structure. If the motion between the two rods 21 and 22 is to be great and is to be relatively easily produced, the sharp edge of the "ellipse" should be aligned with the line of force with the rubber in shear, and this gives basically a linear function; if, however, the relative motion between the stud and the surrounding ring is to be held to a minimum, as in front wheel steering joints of automobiles, the major axis of the "ellipse" should be perpendicular to the line of action, giving basically an exponential function, due to the rubber being mainly in compression.

If the joints were subject only to translation when the joint is in the unrotated position shown in FIGS. 3, 6 and 8-10, "parallelism" would be ideal and the structure of FIG. 9 would be preferred one, but there are other conditions, for the joints are also subjected to shock at times while they are rotated. The joints, moreover, are not only rotated in a horizontal plane, but are also rotated to some extent and under severe conditions in a vertical plane; i.e., they are tipped. Rotation will be considered first, after considering the purpose of the voids 30 and 31.

Significance of the voids 30 and 31

To understand the effects of the voids it may be noted that in FIG. 9 the rubber 65 under compression (between the arc 42 and the bore 28) takes the greatest part of the load, as an exponential function, and the force increases proportionally with the increase in the load; the rubber 66 under tension (between the arc 43 and the bore 28) has an increasingly smaller percentage of the load as pressure is applied, and the rubber 67, 68 under shear (at the ends 44, 45) is subjected to an essentially constant rate of force, or linear function, regardless of how far the stud 41 is displaced from its center position. Hence, removing this rubber 67, 68 which is under shear (i.e., making the voids 30, 31) does not significantly affect the ability of the joint to withstand external pressures.

When the direction of the forces (the line of action 37) is changed 180°, the rubber 66 which was under tension is put under compression, and the rubber 65 which was under compression is under tension, while the two rubber portions 67 and 68 are still under shear but in the opposite direction. Again, if this rubber 67 and 68 is removed (i.e., to make the openings 30 and 31 of FIGS. 1–3), the capacity of the joint to withstand external forces is not materially affected. Since the rubber under shear does not affect materially the capacity of the joint to withstand forces along the line of action, it can be removed without any material effect on the strength of the joint on that line of action.

When the joint 20 is twisted (cf. FIGS. 5 and 7), the rubber 27 around the entire circumference of the joint is placed under shear in one direction. When the direction of the turn changes, the shear force is exerted in another direction. Keeping this in mind, if half the rubber is removed the joint should turn with about half as much torque. When rubber is removed only from the areas 30, 31 where the rubber would be under shear when an external force is applied along the line of action; i.e., the axis of the rod 21, the joint 20 retains its standard amount of capacity and at the same time it will turn more easily. Thus, the openings 30 and 31 serve a two-fold purpose; first, they reduce the amount of force required to turn the joint 20, and secondly, there is no rubber in an area where the percent of elongation of rubber would be greatly increased because of the proximity of the stud 25 to the surrounding ring 23.

Rotation of the joints (FIGS. 5 and 7)

In steering, a force of displacement along the line of action is used to effect rotation of the joint 20. The force of pure rotation of the stud 25 relative to the ring 23 is shown in FIGS. 5 and 7. In FIG. 5, the effect on the holes 30 and 31 is shown, as well as the position of the stud 25 relative to the ring 23. FIG. 7 shows the normal position in solid lines and a rotated position in broken lines. The major axis 29 is shifted about 30° placing the elastomer 27 in shear around the entire circumference of the joint.

The operation, as indicated partly in the change in shape of the openings 30 and 31, results in elongation. Several points, $a$, $b$, $c$, $d$, $e$, and $f$ around the circumference of the ring 23 are shown. Assuming these to remain stationary, the rotation of the study 25 moves points $g$, $h$, $i$, $j$, $k$ and $l$ on its periphery to the location $g'$, $h'$, $i'$, $j'$, $k'$ and $l'$. Elongation of $ag'$ relative to $ag$ is about 40%. Elongation of $bh'$ relative to $bh$ is about 28%. Elongation of $ci'$ relative to $ci$ is about 25%. Elongation of $dj'$ to $dj$ is about 29%. Elongation of $ek'$ relative to $ek$ is about 32%, and elongation of $fl'$ relative to $fl$ is about 42%. The elongations are thus quite practical.

Tipping of the joints (FIG. 11)

In addition to relative displacement and relative rotation in a horizontal plane, under some conditions there is rotation in a vertical plane that passes through the axis of the rod 21, as shown in FIG. 11. Here, there is again some rubber under compression, some rubber under tension, and some rubber under shear.

Combined movements—FIG. 12

As started earlier, "parallelism" is excellent when resolving forces along the line of action of an unrotated and untipped joint. However, when the force is exerted on a rotated joint or one that is both rotated and tipped, the consideration are different. FIG. 12 shows such a condition. It illustrates that parallelism no longer obtains in the joint of FIG. 9 once the stud has been rotated relative to the ring.

As pointed out earlier, when the joint of FIG. 9 is not rotated, the parallel movement of the stud 41 relative to the ring 23 produces an equilibrium of forces that enlarges the area under true compression. However, when the joint is in the position of FIG. 12 with the stud 41 rotated to a position where its arc 42 is parallel to a different portion of the ring 23, a force of displacement exerted along the line of action 37, (which in this instance is approximately along the axis of the rod 21, but could be at an angle to that axis) no longer causes a parallel movement between the stud surface 42 and the bore 28. Instead, the distances vary markedly.

Because of this phenomenon, it is preferable in a joint used in automobiles where there will be inevitably a combination of motions, to have a stud cross-section somewhat rounder than that shown in FIG. 9, preferably like that of FIGS. 1–3. This structure is a compromise structure, and although the results are not as good as in the stud 41 for true displacement in the unrotated position, they are still a great deal better than in a round stud. At the same time, the action is much better than the stud 41 for displacement occurring when the stud is rotated. For some uses, however, a flattened stud like the stud 69 of FIG. 4 may be preferred.

A steering system embodying the invention

FIG. 13 shows a steering system incorporating joints 20 and 20a of this invention. The rods 21 and 22 are shown at the left of the figure and the rods 21a and 22a at the right of the figure. These are the joints in which the rod 21 is a connecting rod and the rod 22 is a steering arm, both connected in the joint as shown in FIGS. 1–3. The rods 21 are connected to an intemediate arm 70, preferably through a joint 71 of a different type, and the rod 21a is connected to the intermediate arm 70, preferably through another joint 71a of the same type as the joint 71. A pitman 72 may be connected to the intermediate arm 70 through a joint 73 generally of the same type as the joint 20. There may also be a similar joint 74 connecting the intermediate arm 70 to an idler arm 75 and a joint or joints 76 connecting the idler arm 75 to the frame 77 of the vehicle. The pitman arm 72 itself is connected to gears inside a steering gear box 78, which itself is connected to the frame 77, and then the gears are connected by a shaft 79 to the steering wheel 80.

The joints 20 and 20a are operated substantially in the manner already described and act not only to turn the front wheels but also to absorb shock and vibration from the front wheels when they strike obstacles in the road or drop into chuckholes.

Freedom from foreign matter

In a standard automative joint, dust is one of the main factors causing failure, and manufacturers have been concerned with the ability of their joints to cope with such environments as salt, dust, ozone, water, ice and oil. Anywhere there is sliding friction dust acts as an abrasive and parts rubbing against each other are worn. The producers of prior art joints went to great length to protect the working members from abrasive particles by incorporating a rubber cap over the top between the stud and the body of the joint and by covering the bottom with a piece of steel. The flex joint of this invention does not require any such additional rubber because the rubber in the joint itself is bonded externally and internally, so there is no place for foreign material to enter. Degradation of the rubber from ozone can be made negligible by proper compounding, and all external factors such as dust, water, ice, salt and oil are excluded. Since the holes 30 and 31 go all the way through the rubber, no pockets are formed that can collect foreign material and the holes are self-cleaning.

Summary of some general relationships of design

The internal bonding areas of the stud 25 and the surrounding ring 23 in a joint 20 of this invention are directly proportional to the external loads imposed and should generally not exceed a constant 250 p.s.i., if maximum life is to be attained. Also, the cross-section of the stud 25 is proportional to the cantilever load that is to be imposed on it, and the clearance between the stud 25 and the surrounding ring 23, the space filled with bonding rubber 27, is proportional to the radial deflection and radial pressure.

The rotary rate of a joint 20 is proportional to the modulus of the rubber, the bonded areas of the stud 25 and the surrounding ring 23, and the mean radius of the rubber from the center of rotation. It is also inversely proportional to the circumferential length of the voids 30 and 31 in the rubber, and the radial distance between the stud 25 and the surrounding ring 23. In addition, the conical rate of the joint 20 is proportional to the length of bonded rubber along the rotary axis of the joint. The maximum limit of conical motion is proportional to ½ the sine of the angle of deflection of the stud axis with respect to the axis of the surrounding ring, and the shear area of the maximum limit of conical motion of the failsafe head 26 is made great enough to exceed an empirical value of pull-out force.

Finally, the resonant frequency of any joint, which is inversely proportional to the rubber mass and directly proportional to the rubber modulus should not be a harmonic of any frequency within the steering system.

The joint of FIGS. 14–17

The flex joints so far described have utilized a round outer ring. However, in some instances it is desirable for the outer ring to be shaped somewhat differently. For example, while joints with round outer rings are able to withstand quite substantial turns with very good results, the life of the joints is sharply reduced when the turns exceed certain limits Once elongation of the elastomer exceeds about 50%, joint service life is markedly decreased. This life can be increased by making the joint in the form shown in FIGS. 14 and 15.

The joint 100 of FIGS. 14 and 15 comprises a generally ovoid or elliptical stud 101 in a surrounding outer ring 102. In this instance the ring 102 has two straight sides 103 and 104, which lie parallel to the major axis of the ovoid stud 101 when the stud is in its rest position. The ring 102 has outwardly curved end portions 105 and 106. The elastomer 107 has voids 108 and 109 between the sharper ends of the stud and the rounded ends 105 and 106.

This shape of outer ring 102 markedly increases the life of the joint in comparison with a round ring. For example, consider steering joints with a round ring 1¼" in diameter and an elliptical stud about .6" wide by about .9" long, with elastomer as in FIGS. 1–3. Tests have shown that a plus or minus 32° twist in the round bore can be withstood with quite adequate life. However, when the degree of twist was changed so that it was up to 48° in one direction and 26° in the other, the life of the joint was reduced to about one-sixth of its original performance level, because the approximately 50% elongation limit of the elastomer had been exceeded.

The cross-sectional area of the elastomer at the ends of the major axis of the generally elliptical stud can be increased by providing for it, in effect, a "square" bore as in FIGS. 14 and 15 rather than a round bore as in FIGS. 1–3. Then the stud 101 can be twisted +48° with no apparent shortening of life in comparison with the twists of 32°.

The percentage of elongation of the elastomer is affected by the fact that elastomer shrinks after being molded, cured, and cooled. Since it shrinks more than the steel parts to which it is bonded, the elastomer is under tension even in its normal "as molded" state. As a result, part of the permissible 50% elongation is consumed before the joint is given any twist. The joint shown in FIGS. 14 and 15 also helps to correct this situation and relieves the stresses caused by shrinkage of the elastomer. It does this by initially molding the joint in the shape shown in FIGS. 16, in which there is a truly square or rectangular outer ring 110. After molding, the elastomer 107 shrinks and it will be noted that near the ends of the major axis of the stud 101, the elastomer 107 becomes concave at faces 111. This is due to about a 2% shrinkage during cure. In this invention, a stress relief may then be accomplished by partially collapsing the surrounding ring 110 inwardly on the axis in which tension and compression are to be experienced; that is, by forces going along the arrows 112 shown in FIG. 16 in toward each other from the two sides. The optimum stress relief calls for the collapsing here to exceed the shrinkage by roughly 20% so that the elastomer is actually under a slight degree of compression. This is shown by the fact that where the faces 111 were formerly concave, the compression produces convex faces 113, as shown in FIG. 15. This, then, makes is possible to impart a small amount of twist to the joint before the elastomer is required to elongate relative to its cured size.

In connection with this action of causing the elastomer to compress, it has been found that when a bonded surface is bent, the bond tends to be injured, apparently by some cracking of the brittle phosphate coat on the metal to which the bonding agents were applied. To offset this, the compression is limited to forcing in the two sides 103 and 104, as shown in FIG. 16, and the outer ends are permitted to bow out creating the curved ends 105 and 106 shown in FIGS. 14 and 15. Such cracking of the phosphate coat as there may then be is thereby limited to the area where there are the voids 108 and 109 in the elastomer 107, and at these locations the bond strength is not critical, for no high stress levels are encountered. The critical areas remain flat and unchanged from their "as cured" condition.

The round joint shown in the earlier figures is quite suitable for joints requiring a range of twisting up to about 35° in each direction, while it is better to use the joint of FIGS. 14 and 15 where turns exceed 35°. Thus in FIG. 17, a turn of 50° of the stud 101 results in the elongations shown. From AF to AF' is a compression of 50%, while from DG to DG' is an elongation of 48%. From BE to BE' is an elongation of 40%, and from CH to CH' is also an elongation of 40%.

To those skilled in the art to which this invention relates, many additional changes in construction and widely differing embodiments of the invention will suggest themselves without departing from the spirit and scope of the invention as defined in the claims.

What is claimed is:

1. A joint connection between two relatively movable rods with interlocking ends that are spaced from direct contact with each other by a molded elastomeric material that is bonded to both of said ends, characterized by one rod end being shaped as a generally cylindrical ring, the other rod end having a stud with a generally oval cross-section along the plane of the ring, said stud extending perpendicular to the plane of the ring and passing axially and centrally through said ring, said oval having a major axis lying generally paralel to the axis of the rod with the ring-shaped end, said elastomeric material substantially filling the space between said stud and said ring except for two void spaces diametrically opposite each other at the opposite extremities of said major axis.

2. The joint of claim 1 wherein said oval is made up of two long circular arcs joned at their ends by shorter circular arcs.

3. The joint of claim 1 wherein said ring is generally circular.

4. A joint connection between two relatively movable rods with interlocking ends that are spaced from direct contact with each other by a molded elastomeric material that is bonded to both of said ends, characterized by one rod end being shaped as a generally cylindrical ring, the other rod end having a stud with a generally oval cross-section along the plane of the ring, said stud extending perpendicular to the plane of the ring and passing axially and centrally through said ring, said oval having a major axis, said elastomeric material substantially filling the space between said stud and said ring except for two void spaces diametrically opposite each other at the opposite extremities of said major axis, said ring having two straight sides parallel to the major axis of the oval and outwardly curved ends where the void spaces are located.

5. The joint of claim 4 wherein the faces of the main body of elastomer at the void spaces are shaped convexly between said stud and said ring, providing two convex ridges at each end.

References Cited

UNITED STATES PATENTS

| | | | |
|---|---|---|---|
| 2,047,976 | 7/1936 | Lord | 287—85 |
| 2,363,469 | 11/1944 | Goldschmidt | 267—57.1 |
| 2,958,526 | 11/1960 | Ulderup et al. | 267—63 |
| 3,275,352 | 9/1966 | Peickii et al. | 287—85 |
| 3,337,232 | 8/1967 | Peickii et al. | 287—85 XR |

FOREIGN PATENTS

| | | |
|---|---|---|
| 592,722 | 9/1947 | Great Britain. |
| 428,419 | 12/1947 | Italy. |
| 59,762 | 2/1954 | France. |
| 517,722 | 3/1955 | Italy. |
| 530,064 | 8/1955 | Italy. |
| 811,668 | 4/1959 | Great Britain. |

CARL W. TOMLIN, Primary Examiner

ANDREW V. KUNDRAT, Assistant Examiner

U.S. Cl. X.R.

267—63